(12) United States Patent
DeKoning et al.

(10) Patent No.: US 6,480,970 B1
(45) Date of Patent: Nov. 12, 2002

(54) METHOD OF VERIFYING DATA CONSISTENCY BETWEEN LOCAL AND REMOTE MIRRORED DATA STORAGE SYSTEMS

(75) Inventors: Rodney A. DeKoning, Augusta, KS (US); Thomas L. Langford, II, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/876,713

(22) Filed: Jun. 7, 2001

Related U.S. Application Data

(63) Continuation-in-part of application No. 09/573,058, filed on May 17, 2000, and a continuation-in-part of application No. 09/573,135, filed on May 17, 2000.

(51) Int. Cl.[7] ................................................. H02H 3/05
(52) U.S. Cl. ............................................. 714/6; 714/5
(58) Field of Search ............................... 714/7, 5, 6, 54, 714/718, 719, 723, 758

(56) References Cited

U.S. PATENT DOCUMENTS

| | | | | |
|---|---|---|---|---|
| 5,195,100 A | * | 3/1993 | Katz et al ........................ | 714/6 |
| 5,469,453 A | * | 11/1995 | Glider et al. ................... | 714/22 |
| 5,915,253 A | * | 6/1999 | Christiansen ................ | 707/103 |
| 5,941,952 A | * | 8/1999 | Thomas et al. ............. | 709/234 |
| 6,385,610 B1 | * | 5/2002 | Deffler et al. ................... | 707/6 |

* cited by examiner

Primary Examiner—Dieu-Minh Le
(74) Attorney, Agent, or Firm—John R. Ley, LLC

(57) ABSTRACT

Data consistency is verified between geographically separated and connected active and mirroring data processing systems by creating metadata which describes user data, such as a cyclical redundancy code (CRC), and time stamp information which describes the time at which user data was first stored on the active system. The metadata and the time stamp information sent from the active system is compared at the mirroring system with the time stamp information and metadata read from the mirroring system. Upon detecting a discrepancy when comparing the metadata from the active and mirroring systems, the user data from the active or mirroring system which is less current temporally, as determined by the time stamp information, is replaced by the user data from the other one of the active or mirroring systems having the more current temporal time stamp information.

19 Claims, 6 Drawing Sheets

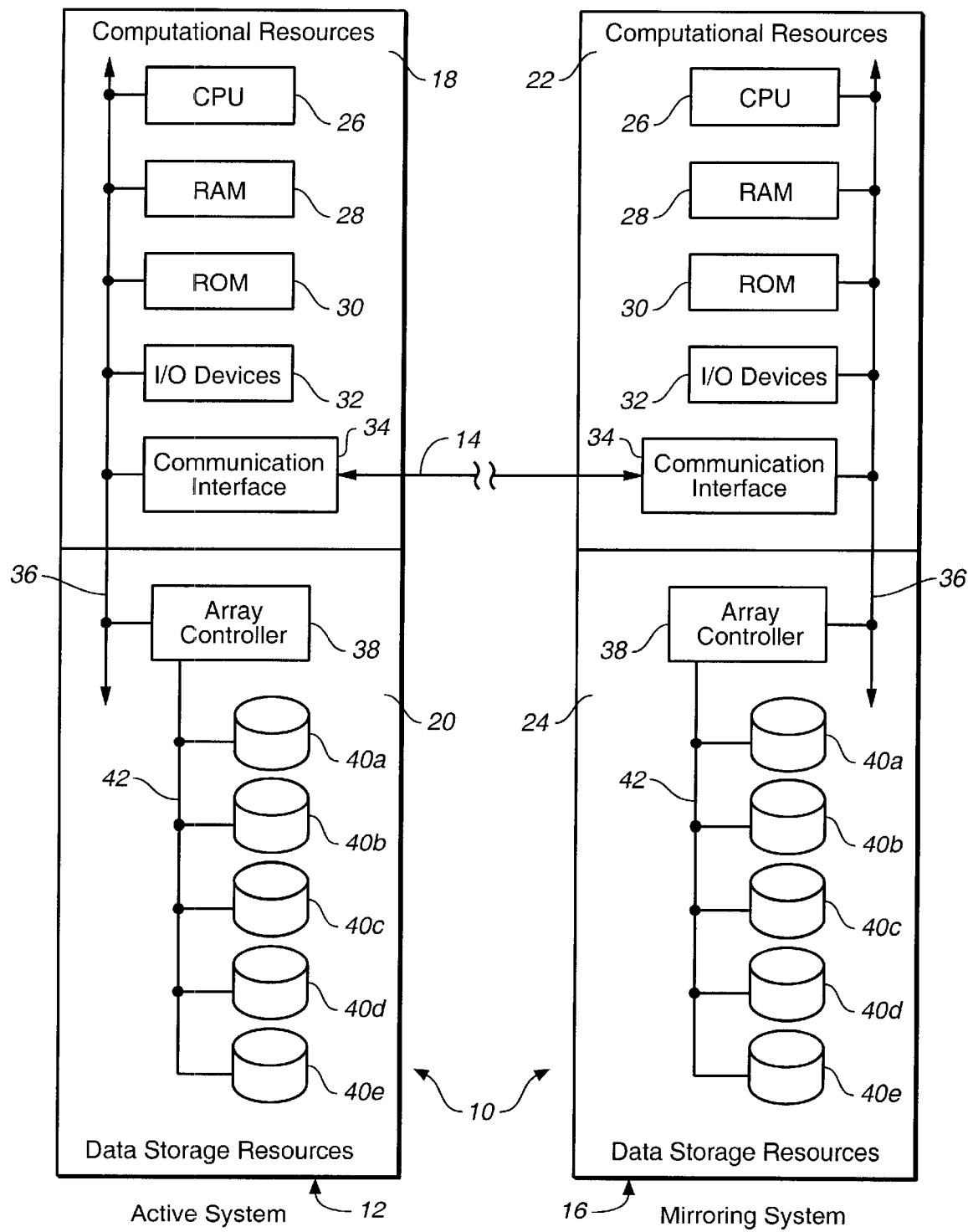
FIG._1

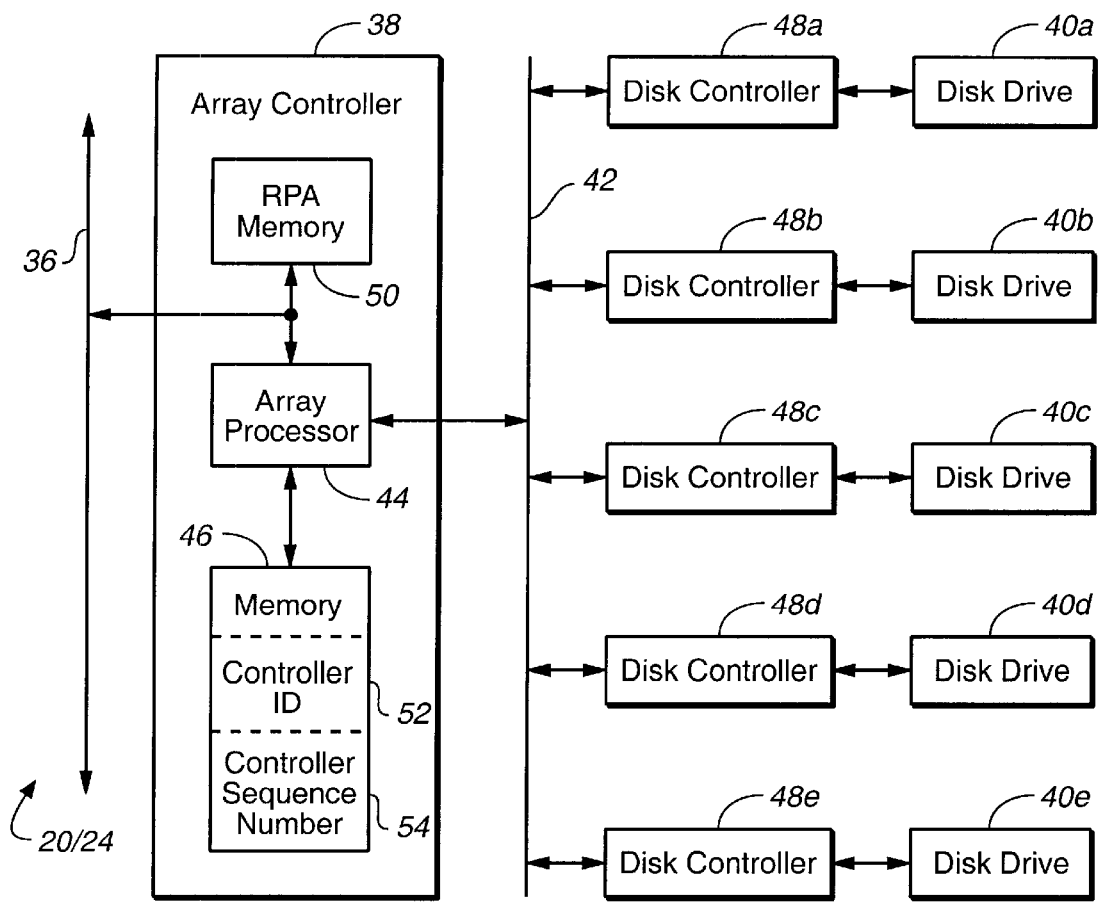
FIG._2
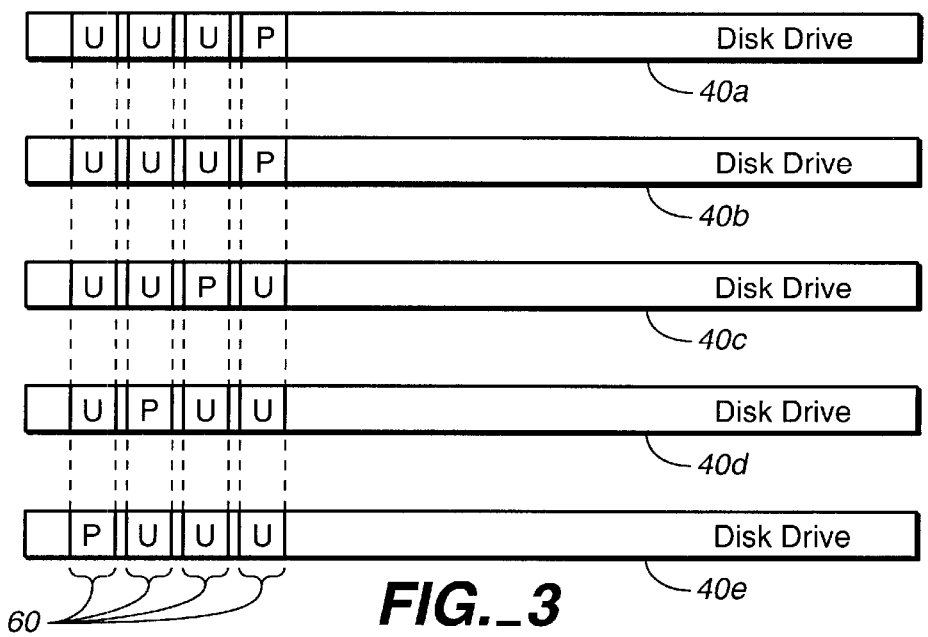
FIG._3

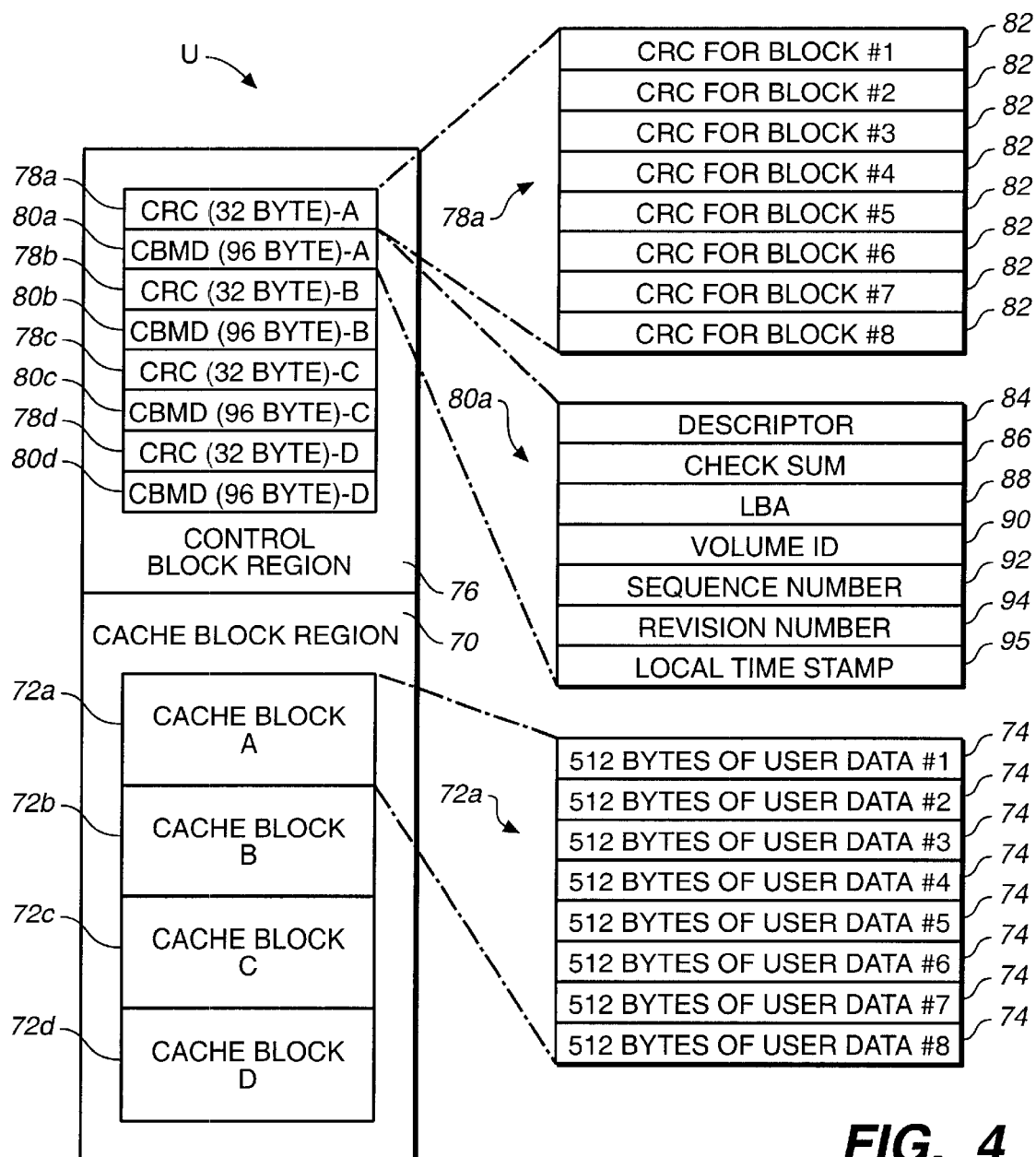
FIG._4

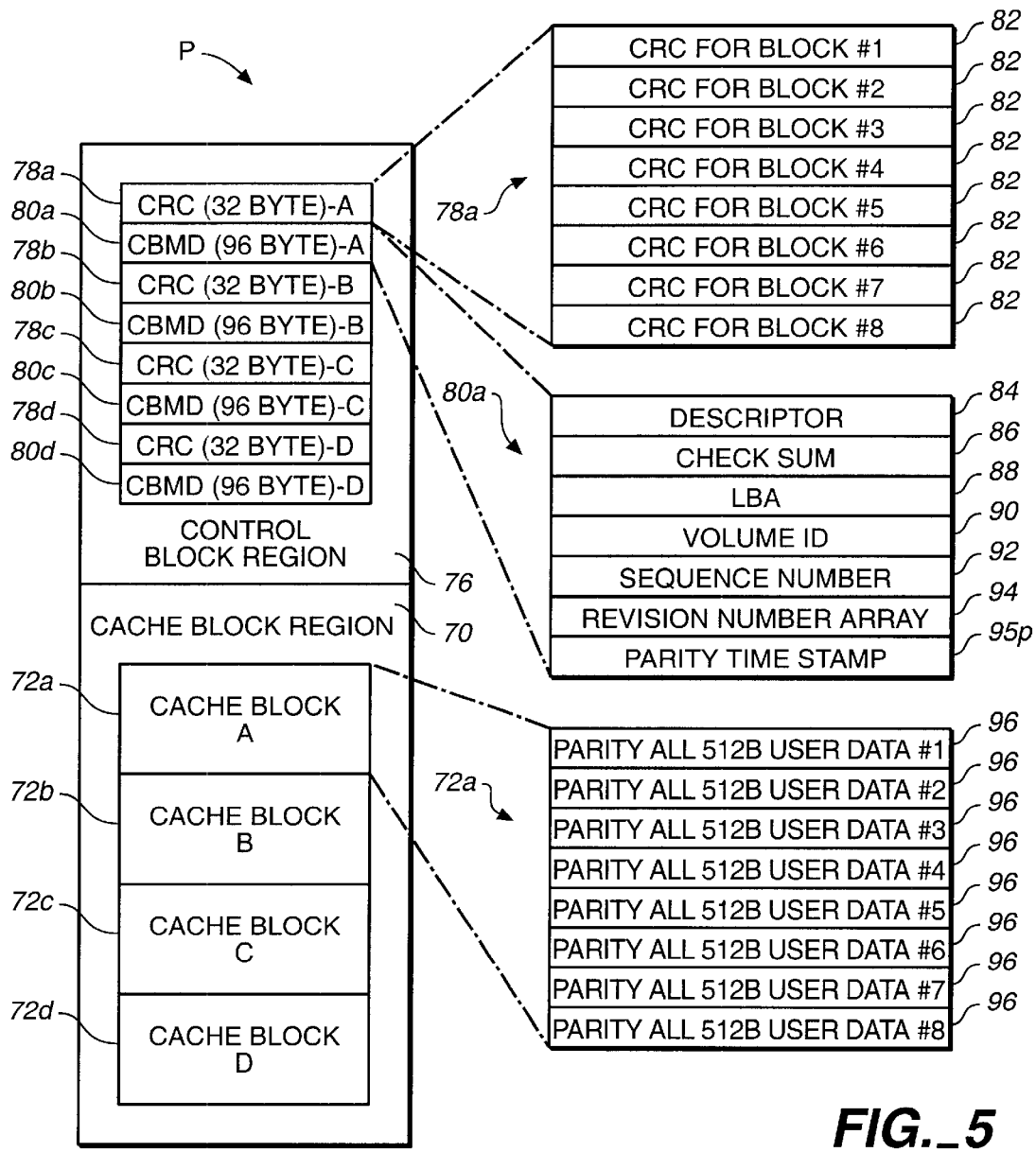
FIG._5

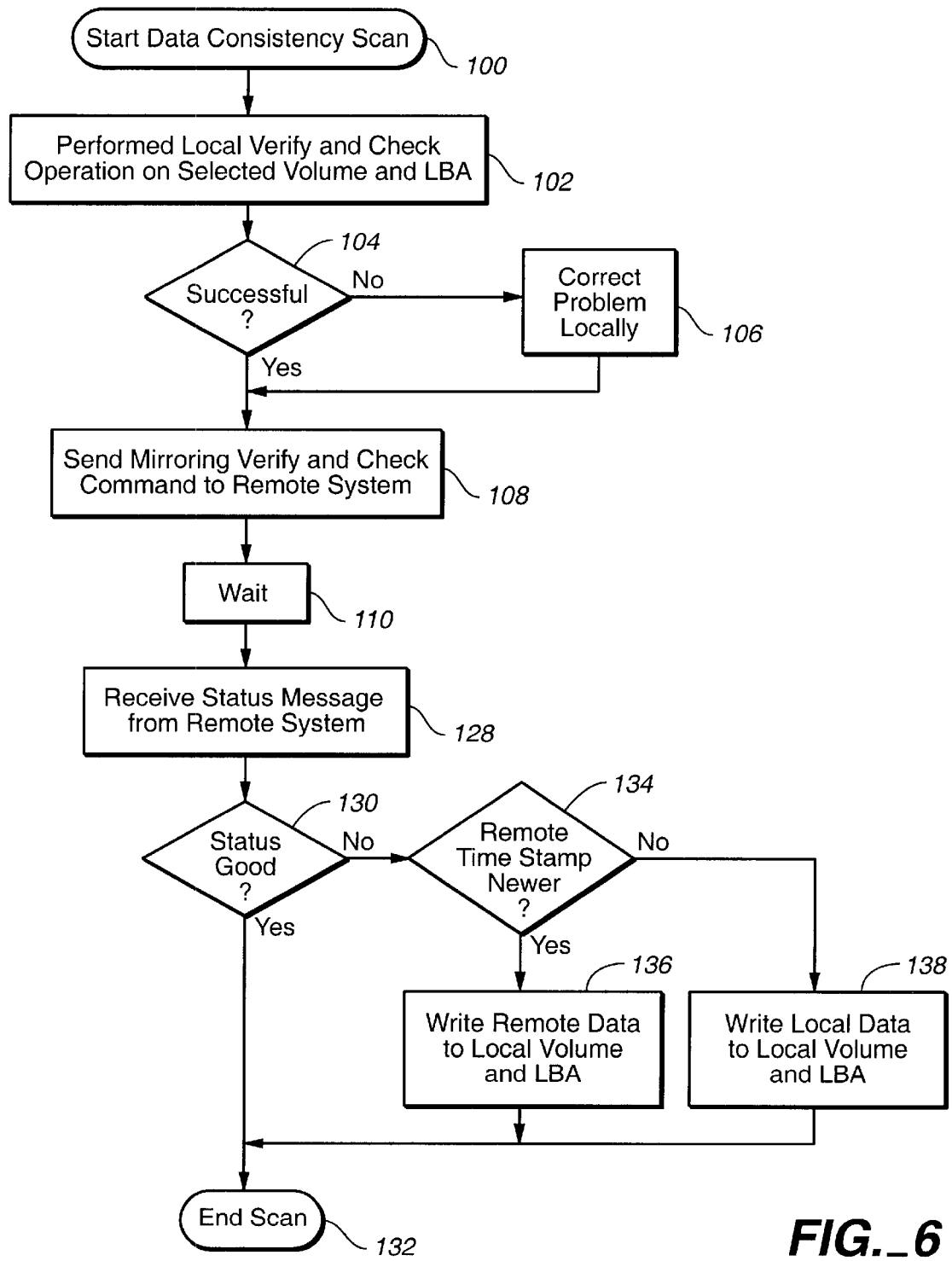
FIG._6

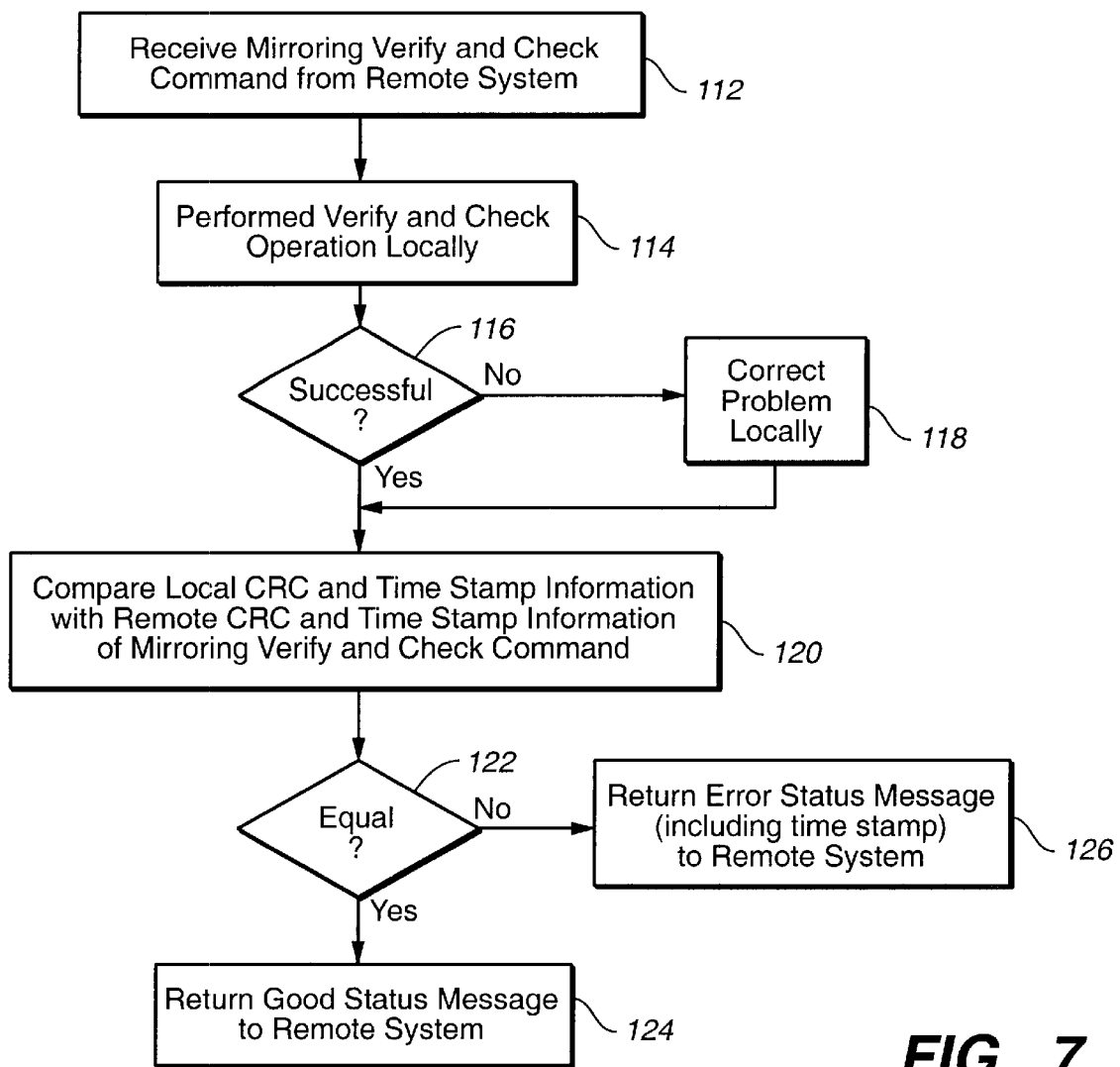
FIG._7

METHOD OF VERIFYING DATA CONSISTENCY BETWEEN LOCAL AND REMOTE MIRRORED DATA STORAGE SYSTEMS

CROSS-REFERENCE TO RELATED INVENTION

This invention is a continuation in part of the inventions described in U.S. patent applications Ser. No. 09/573,058 for filing date May 17, 2000 "Mass Storage Data Integrity-Assuring Technique Utilizing Sequence and Revision ember Metadata," and Ser. No. 09/573,135 for "Data Structures Containing Sequence and Revision Member Metadata Used in Mass Storage Data Integrity-Assuring Technique," both filed on May 17, 2000 by some of the inventors of the present invention, and are assigned to the assignee hereof. Both of these previous applications are incorporated herein by this reference.

FIELD OF THE INVENTION

The present invention relates to electronic data storage in which data is copied or "mirrored" from a local mass data storage system to a remote mass data storage system for the purposes of backup, security and recovery in the event of a catastrophic failure. More particularly, the present invention relates to a new and improved method and data structure by which to verify data and check parity consistency between the local and remote mass data storage systems by communicating only a relatively small fraction of the information previously required between the local and remote systems, thereby increasing the capacity or bandwidth for performing ongoing, non-verification storage operations.

BACKGROUND OF THE INVENTION

Modern data processing systems recognize the imperative nature of preserving and maintaining the correct data for computational use. In some types of data processing systems, such as those used in banks, financial institutions and other organizations which deal with sensitive and critical data, it is absolutely necessary to guard against massive inadvertent data errors and data loss due to equipment malfunctions, system failures and natural disasters. One common way to avoid such catastrophic errors is to copy or "mirror" the complete data stored at an active data processing system to a mirroring data processing system. The mirroring data processing system is located at a geographically remote location. If the active system experiences a catastrophic failure, the mirroring system has all of the data and computational capabilities necessary to assume responsibility for performing the primary data processing functions as a substitute for the failed active system. Conversely, if the monitoring system fails, the active system proceeds in its normal fashion to continue executing the primary computational and data storage functions. As soon as possible after the catastrophe, the failed one of the remote or active systems is again made functional to restore the backup, security and recovery capabilities of the system.

Of course, the functional integrity of such a mirrored mass data storage system depends entirely on the ability to maintain an accurate copy of the data from the active system on the mirroring system, assuming that both systems have comparable computational capabilities. As the active system adds new data to its active mass data storage system, or modifies its existing data, a copy of that new or changed data must be transferred to and stored on the mirroring data processing system on a frequent basis.

Updating the data of the mirroring mass data storage system may occur synchronously or asynchronously. Synchronous updates are performed approximately simultaneously with the change or addition at the active mass data storage system. Synchronous updates occur continually during the use of the active data processing system. Asynchronous updates are performed at periodic time intervals, and involve collecting blocks of added or modified data into groups and communicating the groups at the time intervals. The asynchronous updates occur at relatively frequent intervals, since the integrity of the mirroring system depends maintaining the state of the mirrored data the same as the state of the active data.

Complex mass data storage systems may involve storing tens or hundreds of terabytes of information. During the normal high-intensity use of such complex systems, a significant fraction of the total information will be updated on a continuing basis, either synchronously or asynchronously. The amount of information to be transferred as updates between the active and remote systems requires rapid communication capability between the active and remote systems. Consequently, the active system and geographically-remote mirroring systems are frequently linked by high-speed, high-capacity land lines and satellite links to communicate the data back and forth. Using lower-performance communication links is simply not effective from a performance standpoint, due to the high requirement for continuing updates involving substantial transfers of data between the active and mirroring systems. The cost of using high-speed, high-capacity land lines and satellite links becomes significant in implementing mirrored, redundant data backup systems.

In addition to communicating updates between the active and remote systems rapidly and with minimal time delay, another aspect of a reliable mirrored mass data storage system involves periodically performing disk verify operations or disk verify and parity check operations. A verify and check operation involves scanning the mass storage media, which is usually formed from multiple disk drives configured as a redundant array of independent disks (RAID), looking for disk defects and checking to determine that the stored data and its parity are consistent. Parity is a short mathematical surrogate or proxy for the data. The parity allows the data to be reconstructed, if necessary.

Occasionally a disk drive will degrade to the point that one of the divisions of its storage media, known as a sector, becomes defective. A defective sector is incapable of storing data reliably. The disk verify operation involves reading the data and writing it back, to determine proper functionality. The parity check is an optional and frequently-performed operation which is combined with the disk verify operation. The parity check involves computing the parity of the data read during the verify operation, and comparing the computed parity with the stored parity that was read with the associated data. Although unintended, it is occasionally possible that a disk drive or the associated mass data storage software will create a situation where the data and the stored parity do not match. A mismatch of the parity and data indicates a problem of data reliability, and such problems should be resolved quickly.

It is essential to detect and correct errors arising from a mismatch of the data and parity and from faulty disk drives and sectors while the remaining RAID mass storage system is properly functional. Although RAID mass data storage systems have been developed to permit certain errors to be detected and corrected, substantially all of the remaining, non-faulty components of the RAID system must usually be properly functional in order to correct the error. If multiple parts of the RAID system have failed or degraded, it may be extremely difficult or impossible to correct multiple errors. Thus, if the errors are not searched out and corrected on a reliable and prompt basis, the existence of such errors may prevent correction and data reconstruction. Verify and check operations are intended to seek out and correct such errors before additional errors occur.

The typical technique of performing the verify and check operation in a mirrored system is to periodically transfer entire blocks of data from the mirroring mass data storage system to the active mass data storage system where the data is compared. Transferring such massive amounts of data is expensive because of the cost of using the land lines or satellite links, and because transferring and comparing the data consumes substantial computational resources of the active data processing system. Diverting the computational resources of the active data processing system away from its normal processing activities reduces the overall performance of the active system and frequently requires the size and capacity of the active system to be increased to compensate for performing the transfer and compare activities.

The complexities and costs involved in transfer, compare, verify and check operations have led to the development of techniques to quantify the data for such operations, permitting such operations to be carried out in a convenient manner while simultaneously performing the normal data processing functions. One technique used is to divide the data into groups or blocks, and to perform such operations only on the blocks. The improvements from the two above identified previous inventions, of which the present invention is a continuation in part, involves a technique of effectively grouping data into blocks, combining the data with certain descriptive metadata in a data structure, and then performing activities with respect to each individual data structure. The data structure not only provides a convenient division of the data, but the metadata of the data structure can be effectively used to detect and recover from certain inadvertent errors, on a block-by-block basis or on a group-of-blocks basis. The data within these data structures may be reconstructed and verified in a minimal amount of time while consuming a minimal amount of computer resources. However, these previous inventions do not involve using these beneficial data structures and their data verification and reconstructive techniques for mirroring data between an active system and a geographically remote mirroring system.

The factors summarized above, and other background considerations not specifically mentioned but known within the field of mirrored mass data storage systems, have led to the present invention.

SUMMARY OF THE INVENTION

The present invention involves a method and a data structure which allows the data stored on an active mass data storage system and on the mirroring mass data storage system to be verified as consistent and reliable with a minimal requirement for communicating between the active system and the geographically-remote mirroring system. Another aspect of the invention involves reducing the cost of verifying the consistency of data in a mirrored mass data storage system, both by reducing the necessity for, and amount of communication over expensive land lines and satellite links, and by permitting more of the computational resources to be committed to active data processing operations rather than to verification and data transfer operations. An additional aspect of the invention involves performing verify and check operations between the active system and the mirroring mass data storage system without the need to transfer blocks of data between the systems, while still obtaining a relatively high degree of assurance that the data is consistent between the active and the mirroring systems. Yet another aspect of the invention is to utilize a data storage structure for storing and mirroring data on the active and mirroring systems which permits effective verification of the consistency of the data and the parity both on the local system (either the active or the mirroring system) and the remote other system.

The present invention makes advantageous use of a data structure which is an improved version of that data structure described in the two previous applications. The present invention utilizes the improved data structure to facilitate performing the verify and check operations locally, to thereby establish consistency between the locally stored data and parity. Part of the metadata generated by performing the local verify operation is a cyclical redundancy code (CRC). In accordance with the present invention, a time stamp is also included as part of the metadata of the improved data structure. The time stamp describes the time when the data of that data structure was originally written. The local CRC and time stamp information is communicated by the active system as a part of a mirroring verify and check command sent to the mirroring system. The mirroring system responds by performing a local verify and check operation to determine whether the data and parity of the corresponding mirroring data structures are locally consistent. Thereafter, the time stamp and the CRC which have been read locally are compared to the time stamp and the CRC communicated by the active system as part of the mirroring command. If the two time stamps and CRCs compare to be the same, there is a high degree of assurance that the data and parity on the active and mirroring systems are consistent with one another. If there is disagreement between the two time stamps and the two CRCs, the data with the most current (newest temporally) time stamp is used as the basis for updating the data having the least current (oldest temporally) time stamp.

The time stamp is used to determine which data (active or mirroring copy) to be used in correcting the error on the other system. The comparison of the CRC is used as an indication of whether the data has been erroneously modified or changed. If the CRCs are consistent, it is reliably indicated that the data has not been disturbed and that the data is consistent between the active and mirroring systems. This level of assurance is enhanced by the verify and check operations performed locally at both the active and the mirroring systems using the data structures, before the two time stamps and CRCs are compared.

An enhanced degree of assurance that the local data is accurate or can be corrected is thereby made possible without encountering the necessity, expense or diversion of computational resources involved in transferring substantial amounts of data between the active and mirroring systems to perform previous consistency verification operations. For example, an enhanced level of verification can be achieved in a mirrored system by transferring approximately 16 bytes of information compared to a prior requirement of transferring 4 Kbs of information for each block of data. In this example, the present invention permits a consistency verification operation to be performed by transferring approximately 0.4% of the information previously required to perform such a consistency verification operation on a mirrored mass data storage system.

A more complete appreciation of the present invention and its scope may be obtained from the accompanying drawings, which are briefly summarized below, from the following detail descriptions of presently preferred embodiments of the invention, and from the appended claims.

BRIEF DESCRIPTION OF THE DRAWINGS

FIG. 1 is a block diagram of an active data processing and mass storage computer system and a mirrored data processing and mass data storage computer system connected by a communication link, in which the present invention is incorporated.

FIG. 2 is a block diagram of data storage resources of the active and mirroring computer systems shown in FIG. 1.

FIG. 3 is an illustration of four full stripe write operations performed on the disk drives of the data storage resources of the active and mirroring computer systems shown in FIGS. 1 and 2.

FIG. 4 is an illustration of a user data structure employed in the active and mirroring computer systems shown in FIGS. 1–3, including a user data cache block region and an associated control. block region containing metadata, with explosions of certain fields of those regions.

FIG. 5 is an illustration of a parity data structure employed in the active and mirroring computer systems shown in FIGS. 1–3, including a parity cache block region and an associated control block region containing metadata, with explosions of certain fields of those regions.

FIG. 6 is a flow chart of the operations performed by one of the active or remote mirroring data processing and mass data storage computer systems shown in FIG. 1, as part of a data consistency scan of the data stored by the data storage resources of the active and mirroring systems, in accordance with the present invention.

FIG. 7 is a flow chart of the operations performed by the other one of the active or mirroring systems not shown in FIG. 6, as part of the data consistency scan of the data stored by the data storage resources of the active and mirroring systems, in accordance with the present invention.

DETAILED DESCRIPTION

A mirrored data processing and mass data storage computer system 10 is shown in FIG. 1. The mirrored system 10 includes an active data storage and processing system 12 which is connected through a conventional high-performance communication link 14 to a mirroring data storage and processing system 16. The active system 12 includes computational resources 18 and mass data storage resources 20. In a similar manner, the mirroring system 16 includes computational resources 22 and mass data storage resources 24. Data is stored in the mass data storage resources 20 and 24 as a result of the data processing operations performed by the computational resources 18 and 22, respectively.

Communication of data and commands between the active system 12 and the mirroring system 16 occurs by sending signals between the systems 12 and 16 over the high-performance communication link 14. Typically the high-capacity communication link 14 will be a high bandwidth, high access land line or radio satellite link. Typically the active system 12 will be separated by a considerable geographic distance from the mirroring system 16, to provide enhanced data reliability in case of a natural disaster occurring at the geographic location of one of the systems 12 or 16.

The computational resources 18 and 22 will typically include all of the typical data processing devices of a conventional computer system, other than the mass data storage resources 20 and 24, respectively. Examples of the conventional data processing devices include a central processing unit (CPU) 26, random access memory (RAM) 28, read only memory (ROM) 30, and input output (I/O) devices 32, among others. In addition to the conventional computer system devices 26–32, the computational resources 18 and 22 also include a conventional communication interface 34. The communication interface 34 sends and receives signals over the high-capacity communication link 14. A system bus 36 interconnects the devices 26–34 of each of the computational resources 18 and 22 to enable the transfer of data and control information between the devices 26–32. The system bus 36 also communicates data and control signals to the data storage resources 20 and 24 associated with the competition resources 18 and 22, respectively.

The mass data storage resources 20 and 24 will typically be organized as a conventional redundant array of independent disks (RAID). Each RAID mass storage configuration 20 and 24 is formed by a conventional array controller 38 to which there are connected a plurality of conventional disk drives 40a, 40b, 40c, 40d, 40e etc. Although a single array controller 38 is shown in FIG. 1 as associated with the disk drives 40a–40e of a single RAID configuration, the data storage resources 20 and 24 of the systems 12 and 16 will typically include multiple array controllers 38 and many more disk drives. A conventional peripheral bus 42, such as a standard small computer interface (SCSI) bus connects all of the disk drives 40a–40e to the array controller. The read and write commands and the data to be read or written are communicated over the peripheral bus 42 between the disk drives 40a–40e and the array controller 38. The read and write commands and the data to be read or written is transferred between the array controller 38 and computational resources 18 or 22 over the system bus 36.

The system 12 is designated as the "active" system to represent the situation where it has been designated to accept and perform the primary data processing responsibility. In performing the primary data processing responsibility, the normal data processing input and output will generally be accomplished only through the active system 12. The system 16 is designated as the "mirroring" system to represent the situation where it has the secondary or backup data processing responsibility. The mirroring system 16 is therefore intended to provide redundant data processing capabilities substantially equal to those of the active system 12 only when and if the active system 12 experiences a failure. Should the active system 12 experience a failure, the mirroring system 16 then assumes primary data processing responsibility to assure continued and uninterrupted data processing operations using essentially the same data that was available to the active system 12 prior to its failure.

In order to provide substantially equal and redundant services, it is essential that the mirroring system 16 contain computational resources 22 having essentially the same capability as the computational resources 18. It is also essential that the data which has been stored in the data storage resources 24 be essentially the same data as was stored in the data storage resources 20 of the active system 12 prior to the failure of the active system. It is for that reason that the data initially stored in the data storage resources 20 of the active system 12 must be updated in the data storage resources 24 of the mirroring system 16, as a result of communicating between the systems 12 and 16 over the high performance communication link 14.

Although the term "active" has been shown in FIG. 1 to represent the data processing system having the primary data processing responsibility under normal circumstances where a failure does not occur, the event of a failure will cause the mirroring system 16 to assume the role of performing the primary data processing operations. Thus, in the circumstance of a failure of the normally-regarded active system 12, the mirroring system 16 assumes the active data processing responsibilities for so long as the active system 12 remains in a failed condition.

The terms "local" and "remote" are used in the following description to refer to a relative relationship between the data processing systems 12 and 16. The term "local" will be used as a point of reference for discussion with respect to one of the systems 12 or 16, while the term "remote" will be used to refer to the other system. Thus, in reference to the active system 12, the active system 12 will be the "local" system while the mirroring system 16 will be the "remote" system. Conversely, when referring to the mirroring system 16, it will be the "local" system while the active system 12 is the "remote" system.

Moreover, it is possible that each of the data processing systems 12 and 16 may be the "active" system with respect to certain data processing activities occurring locally to that system, while the remote system becomes the "mirroring" system with respect to the data processing activities occurring locally to the other system. Under such circumstances, both of the systems 14 and 16 perform both an active role with respect to the local data processing activities and a mirroring role with respect to the mass data storage responsibilities of the remote system.

More details concerning the data storage resources 20 or 24 are shown in FIG. 2. Each array controller 38 includes an array processor 44 which is connected to an array memory 46. The array memory 46 stores the programming instructions for the array processor 44 to execute, and thereby achieve, the various functional operations of an array controller 38. A disk controller 48a–48e is connected to each disk drive 40a–40e, respectively. Each disk controller 48a–48e is connected to the peripheral bus 42 and receives the data and the read and write commands addressed to it by the array controller 38. In response to the read and write commands, the addressed disk controller 48a–48e delivers control signals to the attached disk drive 40a–40e, respectively, to accomplish the read and write operations which are commanded by the array controller 38.

In response to a read command from one disk controller 48a–48e, its attached disk drive 40a–40e reads data previously written at an identified location on a conventional rotating disk storage media (not shown) of the attached disk drive, and the data which has been read is supplied by the disk controller to the array controller 38 over the peripheral bus 42. The array controller 38 normally supplies the data which has been read to the computational resources 18 or 22 over the system bus 36, although data may be cached in a conventional RAID parity assist (RPA) memory 50 which is preferably a part of each array controller 38. In response to a write command from the disk controller 48a–48e, the attached disk drive 40a–40e writes the data supplied on the peripheral bus 42 to specific addressed locations on the storage media disk of the attached disk drive. The data written during a write operation has usually been previously supplied from the computational resources 18 or 22 over the system bus 36 to the array controller 38, or the data may have been obtained from the RPA memory 46 of the array controller 38.

A typical hardware part of the RPA memory 50 of the array controller 38 is a conventional cyclical redundancy code (CRC) and parity calculation engine which calculates CRC, parity and other useful metadata information, and stores that calculated CRC and metadata information along with the data written in the RPA memory 50. The CRC and parity calculation engine of the RPA memory eliminates or reduces the need for the array processor 44 of the array controller 38, or for the CPU 26 of the computational resources 18 or 22 to calculate CRC and parity metadata when data is recorded in the RPA memory 50 of the array controller 38.

The array memory 46 comprises a plurality of volatile and non-volatile registers. One non-volatile register 52 stores information which defines a unique array controller identification (ID). The array controller ID uniquely identifies each array controller 38 and distinguishes it from any other array controllers within the mass data storage resources 20 or 24 (FIG. 1). No two array controllers within the mass data storage resources 20 or 24 have the same controller ID.

The non-volatile registers 54 within the array controller 38 store a plurality of controller sequence numbers. A new and different controller sequence number 54 is assigned by each array controller 38 to identify each full stripe write operation performed by that array controller. A full stripe write operation is described in more detail below in conjunction with FIG. 3. The array controller 38 increments the number in the controller sequence number register 54 each time that another full stripe write operation is performed. Thus, each full stripe write operation performed by each array controller 38 is uniquely identified by its own controller sequence number, assigned by the array controller that commanded the full stripe write operation.

The controller sequence numbers in the data storage resources 20 and 24 are likely not to be unique, because each array controller typically assigns its own controller sequence numbers without regard to the controller sequence numbers assigned by the other array controllers. Thus, the controller sequence number assigned by one array controller may be the same as the controller sequence number assigned by another array controller. Even though the controller sequence number is not unique within the data storage resources 20 and 24, a unique number which identifies every specific full stripe write operation performed is described by the-concatenation of the controller ID in register 52 and the controller sequence number in register 54. Since the controller ID is unique, each full stripe write is uniquely identified by this concatenation. This concatenation of the controller ID and the controller sequence number, as applicable to the present invention, is hereinafter referred to as simply the "sequence number."

One of the functional aspects of the array controller 38 is to correlate I/O commands from the computational resources 18 or 22 (FIG. 1) with the disk drives 40a–40e where the data is to be read or written in the data storage resources 20 or 24. Typically this correlation function is achieved by use of a mapping table which associates the I/O commands from the computational resources 18 or 22 (FIG. 1) to the disk drives 40a–40e and the locations on the disks of the disk drives where the data is to be written or read. The mapping algorithm may be dynamic in the sense that it is continually updated to describe where data is written or read. Alternatively, the mapping algorithm may be static to describe the location of the data and parity and other metadata information.

Correlation for the mapping algorithm is established by using volumes and logical block addresses (LBAs) for the data which is written and read. A volume is simply a sub-division of the overall total amount of the storage media available for use. Volumes are arbitrarily defined by the users to accomplish various user-specific purposes. An LBA is a logical address location within each volume which is established between the computational resources 18 or 22 (FIG. 1) and each array controller 38. The LBAs become the correlation in a mapping table between the addresses or physical locations on the various physical disk drives 40a–40e where the data is to be physically stored and retrieved, and the address of the read or write command communicated by the computational resources 18 or 22 (FIG. 1), in order to access that data and information by an I/O operation. Both volumes and LBAs are conventional in mass storage systems.

Another one of the functional aspects of each array controller 38 is to L attempt to fulfill requested I/O read/write operations from the computational resources 18 or 22 (FIG. 1) from data within the RPA memory 50. If the data sought to be read is within the RPA memory 50, a read operation is directed to the RPA memory 50 and not to the disk drives 40a–40e. Information to fulfill I/O operations may frequently be found in the RPA memory 50 because it is used to cache data when processing I/O requests from the computational resources 18 or 22 (FIG. 1).

Each array controller 38 further implements a conventional write algorithm for ordering and delivering data and write commands to the disk drives 40a–40e. A variety of different types of write algorithms may be employed for this purpose. In general, the write algorithm involves writing data in one or more blocks on the disk drives 40a–40e. Multiple data blocks are typically written in a full stripe write operation. A queue of read/write commands is developed to write the blocks of data. The read/write commands of the queue are executed in sequence and delivered to the disk drives in accordance with the write algorithm. Each disk controller 48a–48e responds to the write commands from the array controller 38 to cause its attached disk drive 40a–40e to write the block of data addressed to it. In addition to writing the data as blocks on the disk drives 40a–40e, a similar procedure is used in writing data as blocks in the RPA memory 50.

The present invention attaches or prepends certain additional information and metadata to the raw data when the raw data is written. The additional information includes the volume identification, the logical block address (LBA), the sequence number (the concatenation of the controller ID and the controller sequence number), a revision number (described in greater detail below), and the parity information for the raw data which has been calculated by the parity calculation engine associated with the RPA memory 50. This metadata is used in an efficient manner without significantly degrading the performance of the data storage resources of either the local or remote systems to verify that the data is locally consistent and reliable, while minimizing the transfer of information between the local and remote locations and while minimizing the use of the computational resources for verify and check operations.

When the data storage resources 20 and 24 are organized into RAID configurations, it is typical to separate the collective total information involved in an I/O operation into components, and to record the components of information separately on a plurality of disk drives, in a conventional I/O operation known as a full stripe write. Four exemplary full stripe write operations 60 are graphically illustrated in FIG. 3. Each full stripe write operation 60 shown in FIG. 3 involves writing components of information to each of the five disk drives 40a–40e. The components of information involved in the operation may occupy approximately the same track and sector addresses on each of the disk drives. The same track and sector addresses are represented by the vertical dashed aligned lines. However, it is not a requirement that the components of information occupy the same track and sector addresses on each of the disk drives. Instead, the components of information may be located at different track and sector addresses, in which case the aligned vertical dashed lines represent a logical correlation of the different track and sector addresses on each disk drive 40a–40e to the single full stripe write operation. The correlation is known to the disk controllers 48a–48e and the array controller 38 (FIG. 2). A full stripe write operation is performed only by a single array controller and its associated disk drives 40a–40e. The collective data and other information or metadata written during a full stripe write operation is referred to herein as a "stripe" or a "full stripe."

In accordance with the present invention, each component of information recorded on a separate disk drive is illustrated by the alphabetical letter U or P, to represent a user data structure (U) or a parity data structure (P). A user data structure U and a parity data structure P are described below in greater detail in connection with FIGS. 4 and 5, respectively. As shown in FIG. 3, four user data structures U and one parity data structure P constitute a stripe 60 written during each full stripe write operation. Thus, in the example shown in FIG. 3, four user data structures U and one parity data structure P constitute individual components of the total or collective information associated with each stripe 60.

The manner in which the total information is broken up into the components and distributed among the disk drives 40a–40e in a stripe 60 is established by the mapping algorithm used by the array controllers. Logical block addresses (LBAs) are established by the computational resources 18 or 22 (FIG. 1) or the array processor 44 (FIG. 2) for the information distributed over the disk drives 40a–40e. As can be seen from the examples shown in FIG. 3, the user data structures U involved in each full stripe 60 are preferably distributed among the various disk drives of the redundancy group, so that one disk drive does not contain all of the parity data structures P associated with the user data structures U for each stripe. Distributing the parity and user data information on different disk drives improves performance, because the probability is increased for the relevant information to be more readily available for use when needed, as is known.

As may be understood from FIG. 3, it is typical to perform a conventional read modify write (RMW) operation on some but less than all of the user data structures U of the stripe 60, without changing the other user data structures U of that stripe. RMW operations are performed frequently within stripes 60. In accordance with the present invention, a revision number is assigned by the array processor 44 (FIG. 2) to identify each RMW operation performed on each user data structure U of the stripe 60. The revision number associated with each user data structure U must be consistent with the revision number contained in the parity data structure P of that stripe. Thus, within the user data structures of the stripe, the revision numbers may not be unique. The revision number constitutes a significant portion of the metadata employed in the present invention.

A RMW operation which is performed on some but not all of the user data structures U of the full stripe will change the value of the revision number for each affected user data structure U and the value of the revision number for that user data structure U in the correlated parity data structure P, in the manner described below. However, a RMW operation which is performed on some of the user data structures U of the full stripe will not change the value of the sequence number which identifies that stripe. Changing the revision number for the affected user data structure(s) will not change the value of the revision number for the non-affected user data structures U of that full stripe. Thus, only those user data structures U which have been changed will be assigned a new revision number. As consequence of this revision number assignment technique, the different user data structures U of the full stripe will typically have different revision numbers after a number of RMW operations have been performed on the data of the full stripe. The revision number associated with each user data structure U is recorded as information in the user data structure U (as shown at 94 in FIG. 4) and also in the parity data structure P of the stripe (as shown at 94 in FIG. 5). The revision number is reset to zero in each of the user data structures U and the parity data structure P as a part of initially performing each complete full stripe write operation.

The physical organization of each user data structure U is shown in detail in FIG. 4. The user data structure U is organized into a cache block region 70 and a control block region 76. The cache block region 70 is a field which contains the user data. The control block region 76 contains the metadata used to provide protection against errors. The cache block region 70 is further divided into four separate user data fields in the form of cache blocks A, B, C and D, numbered 72a, 72b, 72c and 72d, respectively. Each of the four user data cache blocks 72a, 72b, 72c and 72d is preferably 4 kilobytes (KB) in size, although any convenient size could be employed such as 1 KB. User data cache blocks 72a, 72b, 72c and 72d of 4 KB size are each formed by eight 512 byte blocks 74. Each 512 byte block 74 is preferably the same length as a conventional sector of a track on the rotating disk storage media of the disk drives 40a–40e (FIGS. 1 and 2). Arranged in this manner, the user data in each user data cache block 72a, 72b, 72c or 72d will occupy eight 512 byte sectors of the disk drives. Because the four cache blocks 72a–72d form the user data cache block region 70, the entire user data cache block region 70 occupies thirty-two 512 byte sectors of the disk drives. To the extent that the user data does not occupy the entire cache block region 70, entire ones or portions of ones of the cache blocks 72a, 72b, 72c and 72d are not used.

The control block region 76 is associated with each cache block region 70, in each user data structure U. The control block region 76 is further broken down into a plurality of cyclical redundancy code (CRC) data fields 78a, 78b, 78c and 78d, and a plurality of cache block metadata (CBMD) fields 80a, 80b, 80c and 80d. One CRC data and one metadata field is associated with each of the user data cache blocks 72a, 72b, 72c and 72d. Thus, the CRC data field 78a and the cache block metadata field 80a are associated with the user data cache block 72a; the CRC data field 78b and the cache block metadata field 80b are associated with the user data cache block 72b; the CRC data field 78c and the cache block metadata field 80c are associated with the user data cache block 72c; and the CRC data field 78d and the cache block metadata field 80d are associated with the user data cache block 72d.

CRC information is calculated and placed into each of the CRC fields 78a–78d based on the user data located in each of the corresponding user data cache blocks 72a–72d, respectively. The CRC information is calculated in a known manner by a conventional CRC and parity calculation engine associated with the RPA memory (50, FIG. 2), as described above, when the user data is transferred into the user data cache blocks 72a–72d. If a separate CRC and parity calculation engine is not used, the CRC and parity information is calculated separately by a processor.

Each CRC field in the control block region 76 is organized into a plurality of CRC fields 82. One CRC field 82 exists for each one of the 512 byte blocks 74 of user data in the user data cache block with which the CRC field is associated. For example, the CRC field 78a includes eight segment CRC fields 82. The user data cache block 72a is formed by eight separate 512 byte blocks 72 of user data. One segment CRC field 82 corresponds to each of the 512 byte blocks 74. Thus, the information in the first segment CRC field (#1) 82 is the calculated CRC for the first (#1) 512 byte block 74 of user data in the user data cache block 72a, as shown in FIG. 4. A similar situation exists with respect to the CRC information in each of the other segment CRC fields 82 for each of their associated 512 byte blocks 72.

One metadata field 80a–80d of the control block region 76 is also associated with each user data cache block 72a–72d of the cache block region 70. Thus, the metadata field 80a is associated with the cache block 72a; the metadata field 80b is associated with the cache block 72b; the metadata field 80c is associated with the cache block 72c; and the metadata field 80d is associated with the cache block 72d. Each metadata field includes a descriptor field 84, a check sum field 86, a logical block address (LBA) field 88, a volume identification (ID) field 90, a sequence number field 92, a revision number field 94 and a local time stamp field 95. The information recorded in the descriptor field 84 is a unique identification which may be used to identify the structure version number or other things. The check sum field 86 contains check sum information which has been calculated across the CBMD field 80a. The check sum information in the check sum field 86 is used conventionally to allow detection of the corrupted data in the metadata field 80a. The information recorded in the LBA field 88 is established by the computational resources 18 and 22 or the array controller 38 (FIG. 1) when mapping the user data into the volume of the data storage resources 20 and 24 (FIG. 1). The information in the LBA field 88 is supplied by the computational resources 18 and 22 or the array controller 38 (FIGS. 1 and 2). The information contained in the volume ID field 90 is an internal, unique identifier of a selected segment of the data storage resource 20 and 24 (FIG. 1).

The information contained in the sequence number field 92 is the sequence number assigned by the array controller 38 (FIG. 1) when a full stripe write operation is performed. As noted above, the sequence number in the field 92 is a concatenation of the unique array controller ID and the array controller sequence number, obtained from registers 52 and 54 (FIG. 2). The concatenation of the array controller ID and the array controller sequence number establishes a sequence number in the sequence number field 92 which is unique within the mass data storage resources 20 and 24 (FIG. 1). As noted previously, the array controller increments the array controller sequence number in the sequence register (54, FIG. 2) with each full stripe write operation performed.

The information contained in the revision number field 94 is generated each time a read modify write (RMW) operation is performed on the affected user data structure U (FIGS. 3 and 4). The revision number information associated with that user data structure is changed each time a RMW operation is performed on the user data of the associated cache blocks 72a, 72b, 72c and 72d. The revision number generated in this manner is recorded in the revision number field 94. When a full stripe write is initially performed, the revision numbers of all of the revision number fields is set to zero. Thus, after a full stripe write is initially completed, all of the revision numbers associated with all of the cache blocks of all of the user data structures U (and of the parity data structure P described below) will be set to zero, to indicate that the full stripe write operation has been initially completed and that no RMW operations have been performed on any of the newly written data of the user data structures U of that full stripe.

The information contained in the revision number field 94 reflects whether any RMW operations have been performed on the user data in the cache block 72a–72d of the associated cache block region 70. Null information in the revision number field 94 indicates that the associated user cache block 72a–72d has not been modified since it was written in the previous full stripe write operation. Information other than null information in the revision number field 94 indicates that a RMW operation has been performed on the information of the the user data cache block 72a–72d. For example, if a RMW operation has been performed on the user data in the cache block 72a, the revision number information in the field 94 will not be zero but will be some finite value which has been incremented from zero. The array controller 38 (FIG. 2) increments the revision number information with each RMW operation, The revision number information in the revision number field 94 will reflect the most recently occurring RMW operation, since the revision number information is changed with each subsequently occurring RMW operation.

The information contained in the local time stamp field 95 identifies the last time that a write operation was performed to the cache block 72a–72d with which the CBMD field 80a–80d is associated. Every time a write command is executed on the local system, the local time stamp information in the field 95 is inserted into the metadata of the local data structure. The local time stamp information is derived by the array controller 38 (FIG. 2) from a conventional clock of the array processor 44 (not shown).

Details of the organization of the parity data structure P are shown in FIG. 5. The parity data structure P has essentially the same structural organization as the user data structure U shown in FIG. 4, except that the cache block metadata fields 80a, 80b, 80c and 80d accommodate an array of revision numbers (a revision number for each associated user data structure U of the stripe) rather than a single revision number as is the case with the user data structures U (FIG. 4). The information contained in the cache block region 70 of the parity data structure P is parity information rather than the user data contained in the cache block region 70 of the user data structures. The information contained in the control block region 76 is CRC and metadata information which describes the parity information contained in the parity data structure P and in the user data structures U of the associated full stripe.

One cyclical redundancy code (CRC) data field and one cache block metadata (CBMD) field is associated with each of the corresponding parity cache blocks 72a, 72b, 72c and 72d of the parity data structure P. Thus, the CRC field 78a and the metadata field 80a are associated with the parity cache block 72a; the CRC field 78b and the metadata field 80b are associated with the parity cache block 72b; the CRC field 78c and the metadata field 80c are associated with the parity cache block 72c; and the CRC field 78d and the metadata field 80d are associated with the parity cache block 72d. CRC information is calculated and placed into each of the CRC fields 78a–78d based on the parity information in the parity cache blocks 72a–72d, respectively. The CRC information is calculated in a known manner by conventional CRC and parity calculation engines when the parity information is transferred into the parity cache blocks 72a–72d.

Each CRC field in the control block region 76 is organized into a plurality of segment CRC fields 82. One segment CRC field exists for each one of the corresponding parity blocks 96 of parity information in the parity cache block 72a–72d with which the CRC field is associated. For example and as is illustrated in FIG. 5, the CRC field 78a includes eight CRC fields 82. The parity cache block 72a is formed by eight separate corresponding parity blocks 96. A different CRC field 82 corresponds to each of the different parity blocks 96. The information in the first segment CRC field (#1) 82 is the calculated CRC for the corresponding first (#1) parity block 96 of parity information in the parity cache block 72a. A similar situation exists with respect to the CRC information in each of the other segment CRC fields 82 for each of their associated corresponding parity blocks 96.

One metadata field 80a–80d of the control block region 76 is also associated with each parity cache block 72a–72d of the cache block region 70. Thus, the metadata field 80a is associated with the parity cache block 72a; the metadata field 80b is associated with the parity cache block 72b; the metadata field 80c is associated with the parity cache block 72c; and the metadata field 80d is associated with the parity cache block 72d. Each metadata field of the parity data structure P includes a descriptor field 84, a checksum field 86, a logical block address (LBA) field 88, a volume identification (ID) field 90, a sequence number field 92, a field 94 for containing an array of revision numbers from all of the user data structures of the full stripe 60 (FIG. 3), and a field 95p for containing a local parity time stamp indicating the time at which the information in the corresponding local cache blocks 72a–72d and CBMD fields 80a–80d of the parity data structure P were last written. The fields 84, 90 and 92 contain a copy of the same information as is present in the corresponding metadata fields of the user data structures U (FIG. 4). The checksum field 86 contains checksum information for the information contained within the metadata field 80a. The LBA field 88 may contain information which describes the entire full stripe. The revision number field 94 contains the revision number of each of the corresponding cache blocks 72a, 72b, 72c and 72d.

Whenever a full stripe write operation is performed, the sequence number is recorded in the metadata field 92 of each user data structure U and the parity data structure P. Each time a RMW operation is performed on the user data contained in one of the user data cache blocks 72a–72d (FIG. 4), the revision number attributed to that RMW operation is written into the metadata field 94 associated with the user data cache block of the user data structure and is written into the metadata field 94 of the parity data structure. Thus, the revision numbers in the array field 94 of the parity data structure P for each of these corresponding cache blocks 72a, 72b, 72c and 72d should correspond to the revision number field 94 in each of the user data structures U, if no error has occurred. In essence, each parity data structure P describes parity information for the entire full stripe write operation.

Every time a write command is executed on the active system and the written data is mirrored, a local time stamp is inserted into the metadata of the local user data structure U (FIG. 4). The parity time stamp 95p of the parity data structure P (FIG. 5) is always updated whenever a full stripe write or a RMW operation occurs. The parity time stamp 95p is calculated from the time stamps 95 of the associated user data blocks by the array controller 38 (FIG. 1) of the active system. This calculation is an exclusive-or (EXOR) of the time stamps 95 from the other corresponding CBMD data block time stamps 95 of the user data structures U (FIG. 4). In this manner, the parity time stamp 95p can be reconstructed from the other corresponding CBMD data block time stamps 95, or a lost CBMD data block time stamp 95 can be recovered from the other CBMD data block time stamps 95 and the parity block stamp 95p. Depending on system requirements, the time stamps can remain constant if desired if an error is detected, or a new time stamp could be used. If the time stamps are held constant, it would not be necessary to update the mirrored data because the time stamp changed. This approach allows the time stamps 95 and 95p to be protected by the checksum field 86 and a parity calculation across the corresponding CBMD data block time stamps 95.

When the data from the active system is mirrored to the mirroring system, the time stamp from the active system is passed to the mirroring system. The mirroring system records the local time stamp from the active system as part of the metadata recorded with the user data and parity structures on the mirroring system. However, the mirroring system treats the time stamp information from the active system as a opaque field when it calculates its own metadata and when it performs local check and verify operations. Consequently, the time stamp information from the active system does not become part of the metadata calculated by the mirroring system from the user data which is mirrored and contained in its local user data structures.

The present invention uses the information contained in the fields of the user data and parity data structures U and P to perform a local verify and check operation. The local verify and check operation may be performed autonomously by either the active system 12 or the mirroring system 16 (FIG. 1), independently of similar verify and check operations performed by the other system. However, the first aspect of a mirroring verify and check command is to perform a local verify and check operation, typically on the active system 12 because the active system typically initiates the mirroring verify and check command. Should a defect be discovered locally as a result of performing the local verify and check operation, the user data and the metadata in the local user data and parity data structures are used to make corrections locally, in the same manner as has been described in greater detail in the above referenced U.S. patent applications. Performing the local verify and check operation assures accurate local user data as a part of the mirroring verify and check command.

After performing the local verify and check operation, the active system issues the mirroring verify and check command to the mirroring system. The time stamp and CRC information which has been derived locally by the active system is passed to the mirroring system as part of the mirroring verify and check command. In response to the mirroring verify and check command, the mirroring system performs a local verify and check operation on the volumes and LBA's identified in the mirroring verify and check command. Because the mirroring system should be a copy of the active system, the volumes and LBA's on the mirroring system are the same as those on the active system. In addition, the mirroring system temporarily stores the time stamp and CRC information from the active system transferred as part of the mirroring verify and check command. If the mirroring system detects an error when performing a local verify and check operation, the metadata of the local user and parity data structures of the mirroring system is used to correct that error. Once any local errors on the mirroring system have been corrected, the local CRC and time stamp information obtained from the mirroring system is compared with the active CRC and time stamp information which was transferred to the mirroring system as a part of the mirroring verify and check command.

If the CRC and time stamp information obtained locally from the mirroring system matches with the CRC and time stamp information passed as part of the mirroring command from the active system, the mirroring system returns a message to the active system which indicates a good or identical status of the data written on the mirroring system compared to the data written on the active system. However, if the CRC or the local time stamp information from the mirroring system does not compare identically with the CRC or active time stamp information passed as a part of the mirroring command, an error is indicated. A difference in the CRC information indicates a difference in data. A difference in the time stamp information indicates a difference in the time when the data was stored. Either difference will result in the mirroring system returning an error message to the active system. Comparing the CRC information basically verifies whether or not the data from the local and remote systems match. If not, the time stamp information indicates which data, from the remote or local system, should be used for correction. The most temporally current data should be used for the correction. The error message returned to the active system contains the time stamp of the data written on the mirroring system.

In response to the error message from the mirroring system, the active system determines whether the local time stamp from the active system or the remote time stamp from the mirroring system is more current temporally. Under the assumption that the most temporally current data is the accurate data, the data from the system with the more temporally current time stamp is written to the other system, thereby mirroring the most temporally current data to both the active and the mirroring systems.

More details are shown in FIGS. 6 and 7 of the manner in which the present invention uses the user data structures (U, FIG. 4) and the parity data structures (P, FIG. 5) to mirror user data between the active system 12 and the mirroring system 16 (FIG. 1) to perform a data consistency scan of the data of the identical volumes and LBAs of the active and mirroring systems. As shown in FIGS. 6 and 7, individual steps or operations in the program flow are shown by separate referenced numbers.

The data consistency scan begins at step 100 shown in FIG. 6. At step 102 the local one of the active system 12 or the mirroring system 16 (FIG. 1) performs a local verify and check operation on a selected volume and LBA. The local verify and check operation is performed in the conventional manner, by first selecting a volume and the LBA of that volume and then reading the data from the user data structures U (FIG. 4). Reading the data from the user data structures verifies that the data can actually be retrieved from the media of the data storage resources 20 or 24 (FIGS. 1 and 2). Reading the data from the media in this manner also allows the metadata associated with that data to be verified, as that metadata is contained in the parity data structures P (FIG. 5) and the user data structures U (FIG. 4). Furthermore, reading the data from the data storage resources 20 or 24 (FIGS. 1 and 2) allows the parity to be again calculated, to make sure that the parity and data match. The parity and the data can be exclusive-ored together, and if the result of the exclusive or operation is not zero there is a problem.

The step shown at 104 indicates whether or not the locally performed verify and check command has detected a problem. A problem would be indicated if the metadata calculated did not match the metadata read from the user data and parity data structures, or if the exclusive-or operation of the calculated parity and the data did provide a zero result. In the case of an unsuccessful local verify and check operation indicated at step 104, the problem with the local data is corrected at step 106. Correction of the local data proceeds in the manner described in the previously two referenced patent applications, using the information contained in the user data structures U (FIG. 4) and the parity data structures P (FIG. 5). Once the problem has been fixed at step 106, or if the local verify and check operation performed at step 102 was successful as determined at step 104, the program flow proceeds to step 108.

At step 108, the one that the active or mirroring systems 12 or 16 (FIG. 1), which initiated the data consistency scan, sends a mirroring verify and check command to the remote system. The mirroring check and verify command includes the information which describes the volume and the LBA of the media which is to be verified as the same volume and LBA of the one of the active or mirroring systems which initiated the data consistency scan. The mirroring verify and check command sent at step 108 also includes the CRC and time stamp information which was read from the metadata portions of the user data structures and the parity data structures during the performance of the local verify and check operation shown at step 102. Thus, the mirroring verify and check command sent at step 108 not only includes the command, but also includes the volume and LBA to identify where on the mirroring system the data consistency scan is to be performed, as well as the CRC and the time stamp information which used in accordance with the present invention to verify consistency or to identify inconsistency in the comparable volumes and LBAs which are involved in the data consistency scan.

After the mirroring verify and check command has been sent at step 108, the local one of the active or mirroring systems which initiated the data consistency scan waits, as shown at step 110, for a response from the other or remote one of the active or mirroring systems to which the mirroring verify and check command was sent. The operations of the other one of the active or mirroring systems in response to receiving the mirroring verify and check command is shown in FIG. 7.

As shown at step 112, the other one of the active or remote systems has received the mirroring verify and check command which was sent at step 108 (FIG. 6). In response to the receipt of the mirroring verify and check command at step 112, a local verify and check operation is performed at step 114. The local verify and check command performed at step 114 proceeds in exactly the same manner as occurs at step 102, and as is more completely described in the previously mentioned prior U.S. applications.

If the locally performed verify and check operation 114 is not successful, as determined at step 116, the problem is corrected locally at step 118. Any problems detected by the local verify and check operation are corrected using the user data structures and the parity data structures in the manner described in the previously mentioned prior U.S. applications. Once any problem is corrected at step 118, or if the local verify and check operation was performed successfully as determined at step 116, the program flow proceeds to step 120.

At step 120, the local CRC and time stamp information obtained by reading such information from the local user data structures and parity data structures is compared to the remote CRC and time stamp information which was passed with the mirroring verify and check command sent at step 108 (FIG. 6) and received as step 112 (FIG. 7). A failure of the CRC information to compare equally indicates a difference in the data itself. Under such circumstances the time stamp information will also differ, because the difference in data is an indication of different times at which that data was written.

Step 122 represents a determination of whether the CRC and time stamp information compared at step 120 is equal. If equality of the CRC and time stamp information is determined at step 122, the one of the active or remote systems performing the operation shown in FIG. 7 returns a good status message at step 124 to the remote system performing the operations shown in FIG. 6. On the other hand, if the determination at step 122 shows that there is a difference in the locally derived CRC and time stamp information compared to the CRC and time stamp information sent with the mirroring verify and check command received as step 112, the one of the active or remote systems performing the operations shown in FIG. 7 returns an error status message at step 126 to the other remote system performing the operations shown in FIG. 6. The error status message returned at step 126 includes the CRC and time stamp information obtained locally from reading the user data structures and parity data structures identified in the mirroring verify and check command received as step 112.

During the waiting period 110 shown in FIG. 6, the one of the active or remote systems performing the function shown in FIG. 6 is waiting to receive one of the error status message 124 or the good status message 126 (FIG. 7) from the other one of the active or remote systems. At step 128, shown in FIG. 6, either the error or the good status message is received. If the message received at step 128 indicates good status, as determined at step 130, there is an indication that the data on the other one of the remote or active systems performing the operation shown in FIG. 7 is consistent with the data on the one of the active or remote systems which initiated the data consistency scan shown in FIG. 6. Under such circumstances, no corrective action is necessary and the data consistency scan for the selected volume and LBA is completed at step 132. If further data consistency scans are desired for other selected volumes and LBAs, the flow of operations shown in FIGS. 6 and 7 may be repeated as many times as necessary.

If the determination at step 130 indicates that the status is not good, in other words, an error status message (step 124, FIG. 7) has been returned, a determination is thereafter made at step 134 as to whether the remote time stamp information included within the error status message sent at step 126 (FIG. 7) indicates temporarily more current or newer information. If so, this would indicate that the data recorded in the user data structures of the remote system (i.e. the system performing the operations shown in FIG. 7) is newer and should be used to replace the older data recorded in the user data structures of the local system performing the operation shown in FIG. 6. In such circumstances, the remote system is commanded to write its data to the local system at the local volume and LBA addresses, as shown in step 136. On the other hand, if the determination at step 134 indicates that the remote time stamp information is not temporarily more current, i.e. older, then the local system writes its data to the remote system as shown in step 138.

By including the time stamp information in the time stamp fields 95 and 95*p* of the user data structures U (FIG. 4) and parity data structures P (FIG. 5), and using the time stamp information in conjunction with the CRC information 78a, 78b, 78c and 78d, the present invention permits a determination of data consistency between the active and remote systems without the necessity to transfer blocks of data. The CRC information indicates a disparity in the data, and the time stamp information is used to select the most temporarily current data to replace the disparate data. By sending the relatively small amount of CRC and time stamp information instead of the relatively larger amount of data itself, the data consistency scan is performed without consuming the resources and cost of the relatively expensive communication links and without occupying a significant amount of the computational resources of either the active or mirroring systems. Since local verify and check commands will be performed in any event, the data consistency scan between the active and mirroring systems can also be performed conjunctively while consuming very few additional computational resources. Many other advantages and improvements will be apparent upon gaining a full understanding and appreciation of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. A method of verifying data consistency between active and mirroring data processing systems, each of which includes data storage resources having storage media upon which user data is stored, comprising the steps of:

storing the user data in the data storage resources of each of the active and mirroring systems;

calculating the metadata which describes the user data stored at each of the active and mirroring systems when the user data is stored;

storing the calculated metadata in association with the user data;

creating time stamp information which describes the time at which the user data was first stored on the active system;

storing the time stamp information in association with the user data stored in the data storage resources of both the active and mirroring systems;

sending the time stamp information and the metadata obtained from the data storage resources of the active system to the mirroring system;

reading the time stamp information and the metadata from the data storage resources of the mirroring system;

comparing the metadata sent from the active system with the time stamp information and metadata read from the mirroring system; and upon detecting a discrepancy in the metadata from the active and mirroring systems, replacing the user data in the one of the active or mirroring systems having the less current temporal time stamp information with the user data from the one of the active or mirroring systems having the more current temporal time stamp information.

2. A method as defined in claim 1 further comprising the steps of:

performing a verify and check operation on the user data, metadata and time stamp information stored on the data storage resources of the active system before sending the metadata from the active system to the mirroring system; and performing a verify and check operation on the user data, metadata and time stamp information located on the data storage resources of the mirroring system before comparing the metadata.

3. A method as defined in claim 2 further comprising the step of:

correcting any discrepancies in the user data, the metadata and the time stamp information stored on the data storage resources of the active system as a part of the verify and check operation performed at the active system before sending the metadata from the active system to the mirroring system.

4. A method as defined in claim 3 further comprising the step of:

correcting any discrepancies in the user data, the metadata and the time stamp information located on the data storage resources of the mirroring system as a part of the verify and check operation performed at the mirroring system before comparing the metadata.

5. A method as defined in claim 1, further comprising the steps of:

comparing the metadata at the mirroring system; and sending an error message from the mirroring system to the active system upon detecting the discrepancy in the metadata, the error message containing the time stamp information read from the mirroring system.

6. A method as defined in claim 5, further comprising the steps of:

receiving the error message at the active system; and comparing the time stamp information from the error message with the time stamp information stored on the data storage resources of the active system.

7. A method as defined in claim 6, further comprising the step of:

initiating a write command from the active system to replace the user data having the less current temporal time stamp information with the user data having the more current temporal time stamp information.

8. A method as defined in claim 1, further comprising the step of:

sending to the mirroring system the time stamp information obtained from the data storage resources of the active system along with the metadata obtained from the data storage resources of the active system.

9. A method as defined in claim 8, further comprising the step of:

comparing the time stamp information and the metadata sent from the active system with the time stamp information and metadata read from the mirroring system.

10. A method as defined in claim 1, further comprising the steps of:

storing the user data in a user data structure; and storing the calculated metadata and the time stamp information in the user data structure.

11. A method as defined in claim 1 further comprising the steps of:

storing the user data in a plurality of user data structures on the data storage resources of both the active and mirroring systems;

storing the calculated metadata and the time stamp information associated with the user data in the same user data structure in which the associated user data is stored;

associating a parity data structure with each of a plurality of user data structures; and storing parity information in each parity data structure which describes the information in the plurality of associated user data structures.

12. A method as defined in claim 11, further comprising the step of:
   storing logical block address information, volume identification information, sequence number information and revision number information in each user data structure which is associated with the user data stored in the user data structure.

13. A method as defined in claim 12, further comprising the step of:
   storing copies of the user data structures at identical volumes and logical block addresses in the active and mirroring systems.

14. A method as defined in claim 13, further comprising the steps of:
   storing logical block address information, volume identification information, sequence number information and revision number information in each parity data structure which is associated with the plurality of user data structures.

15. A method as defined in claim 14, further comprising the step of: storing the metadata describing the user data in the form of a cyclical redundancy code.

16. A method as defined in claim 15, further comprising the steps of:
   constituting the data storage resources of each of the active and mirroring systems as a redundant array of independent disks; and
   storing the plurality of user data structures and the associated parity data structure by performing a full stripe write operation on the redundant array of independent disks.

17. A method as defined in claim 1, further comprising the step of:
   storing the metadata describing the user data in the form of a cyclical redundancy code.

18. A method as defined in claim 1, further comprising the steps of:
   geographically separating the active and mirroring systems; and
   connecting the active and mirroring systems for communication with a high speed, high access communication link.

19. A method as defined in claim 1, further comprising the steps of:
   constituting the data storage resources of each of the active and mirroring systems as a redundant array of independent disks.

\* \* \* \* \*